July 12, 1960 M. E. MARON ET AL 2,944,738

LOGICAL COMPUTING DEVICE

Filed Feb. 23, 1954 6 Sheets-Sheet 1

INVENTOR.
MELVIN E. MARON
JOHN W. HAANSTRA
BY
John B. Sponsler
AGENT

LOGICAL COMPUTING DEVICE

Filed Feb. 23, 1954

INVENTOR.
MELVIN E. MARON
JOHN W. HAANSTRA
BY John B. Sponsler
AGENT

INVENTOR.
MELVIN E. MARON
JOHN W. HAANSTRA
BY
John B. Sponsler
AGENT

INVENTOR.
MELVIN E. MARON
JOHN W. HAANSTRA
BY
John B. Sponsler
AGENT

July 12, 1960 M. E. MARON ET AL 2,944,738

LOGICAL COMPUTING DEVICE

Filed Feb. 23, 1954 6 Sheets-Sheet 5

INVENTOR.
MELVIN E. MARON
JOHN W. HAANSTRA
BY
John B. Sponsler
AGENT

INVENTOR.
MELVIN E. MARON
JOHN W. HAANSTRA
BY
John B. Sponsler
AGENT 2,944,738

Patented July 12, 1960

2,944,738

LOGICAL COMPUTING DEVICE

Melvin E. Maron, Santa Clara County, and John W. Haanstra, San Jose, Calif., assignors to International Business Machines Corporation, New York, N.Y., a corporation of New York Filed Feb. 23, 1954, Ser. No. 412,006

2 Claims. (Cl. 235—156)

The present invention appertains generally to computers and relates more particularly to computers for processing non-numerical information.

It is an object of this invention to provide a computer which operates on a language other than the language of arithmetic.

Another object is to provide a computer for determining logical relationships of sentences.

A further object is to provide an improved means for deciding whether or not one piece of data is logically implied by other given data.

Still another object is to provide a logical computer which is able to perform certain logical operations on a language by following given transformation rules which govern the manipulation of that language.

Other objects of the invention will be pointed out in following description and claims and illustrated in the accompanying drawings, which disclose, by way of example, the principle of the invention and the best mode which has been contemplated of applying that principle.

In the drawings:

Figs. 1*a*, 1*b*, 1*c* and 1*d*, taken together, comprise a schematic diagram of a preferred form of the invention.

Figure 1A:
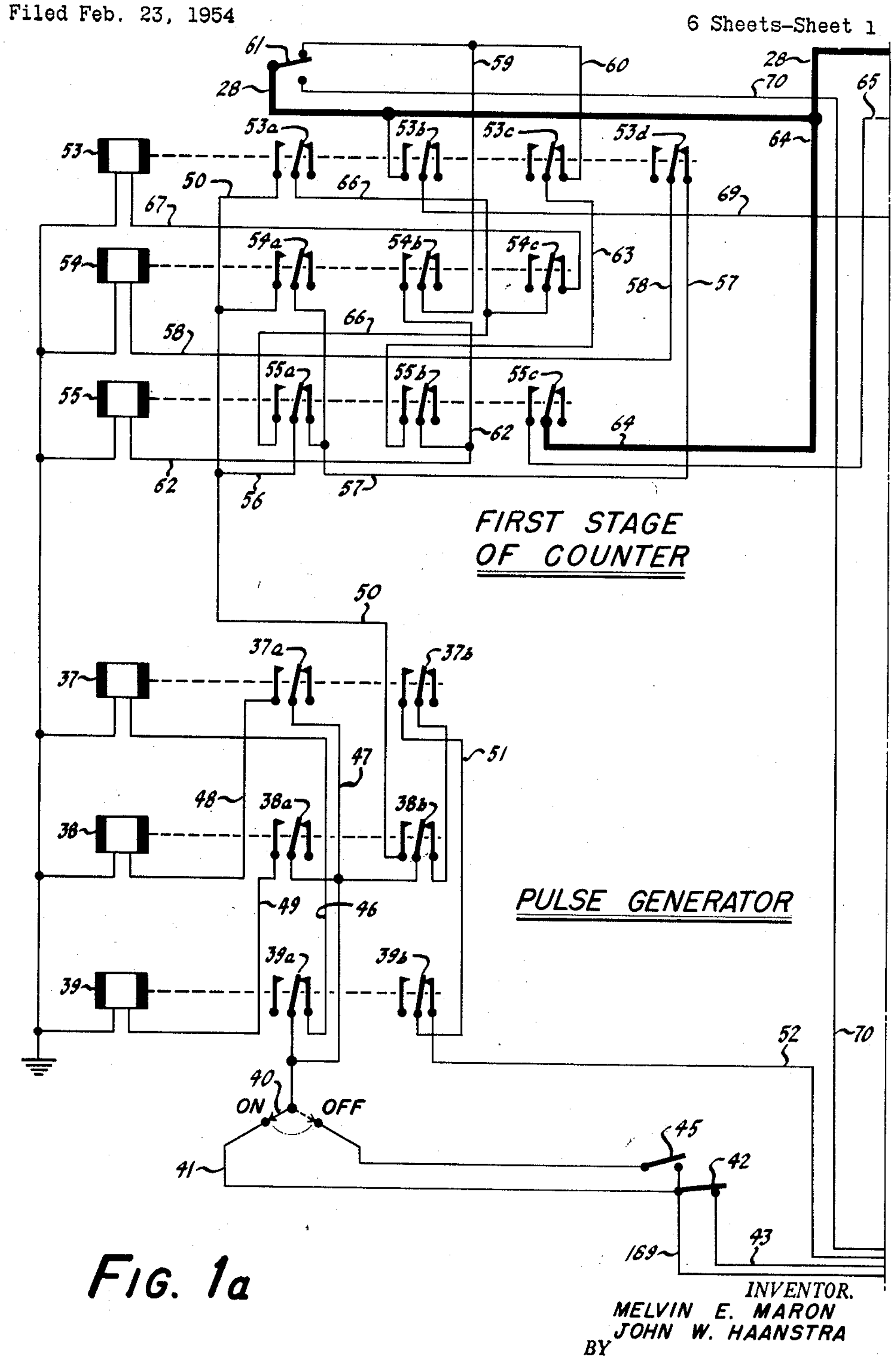

The language utilized by most existing computers is the language of arithmetic, whether it be binary, decimal, etc., and the rules of transformation, i.e., the rules of addition, subtraction, multiplication and division, of such computers are built into their operation. It is only necessary that the information fed to the machine be properly formed. (The rules of formation of the language of arithmetic tell us that such expressions as "$x-y$" and "$x(y-z)$" are properly formed, whereas other expressions such as "$x-$" and "$x,\ y-z$" are not properly formed.) The computer of the present invention is designed to utilize a language other than that of arithmetic, i.e., the language of sentential calculus, the rules of transformation of this language being built into the operation of the machine. Before the machine may operate upon the input information, it is necessary, as above, that the input information to the machine be properly formed.

In order to fully appreciate a detailed description of the device, it is first necessary to understand the language upon which it operates. The language of the sentential calculus contains an infinite number of two-valued variables, "*p*," "*q*," "*r*," "*s*," etc., each of which may be thought of as standing for a sentence. Such sentences are defined as meaningful expressions which may be either true or false, but not both. These variables may be combined by the logical connectives of negation, alternation, conjunction, condition or bi-condition, as may be desired, the symbols "–," "v," "·," "⊃" and "≡," respectively, being used to designate such connectives.

The rules of formation of the sentential calculus specify that, if "*p*" is a variable, then both "*p*" and "$\bar{p}$" (not *p*) are properly formed. Additionally, if each of "*p*" and "*q*" are properly formed, i.e., if each is a variable, then "*pvq*" (*p* or *q*), "*p·q*" (*p* and *q*), "*p⊃q*" (if *p* then *q*), and "*p≡q*" (*p* if and only if *q*) are properly formed. Nothing else is properly formed. To permit proper analysis of a compound expression, it is well to bear in mind the following well known rules of logic, which rules are the rules of transformation of sentential calculus which are built into the operation of the machine of the invention, as will become clear hereinafter: (1) if "*p*" is true, then "$\bar{p}$" is false, and vice versa, (2) the expression, "*pvq*," is true if either "*p*" or "*q*" is true, (3) the expression, "*p·q*," is true only if both "*p*" and "*q*" are true, (4) the expression, "*p⊃q*," is false if and only if "*p*" is true and "*q*" is false, and (5) the expression, "*p≡q*," is true only if "*p*" and "*q*" have the same truth value.

Properly formed expressions, such as "*p⊃q*" and "*r≡s·t*," etc., fall into one of three categories, α, β, or γ. Those in class α are either true or false, and all elementary expressions, such as "*p*," "*q*," "*r*," etc., are included therein. The truth value of expressions within class α depends upon whether or not they describe the facts correctly. Class β includes all properly formed expressions which must be true, and class γ includes those which must be false. The most important of the three classes, for the present interests, is class β. To say that an expression falls into class β, is to say that for all possible truth values of its components the compound expression must be true.

One may decide mechanically whether or not a given expression falls into class β by substituting different truth values for the components of the expression and testing the results according to the above defined rules of transformation. Consider, for example, the expression "*p·q⊃pvr*"

(if "*p*" and "*q*," then "*p*" or "*r*"). Since there are three variables, "*p*," "*q*" and "*r*," there are $2^3=8$ possible combinations of values that the elements of the compound expression may take, i.e., "*p*" true with "*q*" and "*r*" false, "*p*" and "*q*" true with "*r*" false, etc. If the compound expression is true for all possible combinations, then it belongs to class β. The following tables indicate how one may decide mechanically whether or not the expression "*p·q⊃pvr*" belongs to class β. In Table A, all the truth values of "*p*," "*q*" and "*r*" and the resulting truth values of "*p·q*" and "*pvr*" are tabulated. By letting "*p·q*"="A" and "*pvr*"="B," the truth values of the compound expression "A⊃B," i.e., "*p·q⊃pvr*," may be determined. Bearing in mind that "A⊃B" is false if and only if "A" is true and "B" is false, the desired information is indicated in Table B.

*Table A*

| p | q | r | p·q | pvr |
|---|---|---|---|---|
| T | T | T | T | T |
| T | T | F | T | T |
| T | F | T | F | T |
| T | F | F | F | T |
| F | T | T | F | T |
| F | T | F | F | F |
| F | F | T | F | T |
| F | F | F | F | F |

*Table B*

| A | B | A⊃B |
|---|---|---|
| T | T | T |
| T | T | T |
| F | T | T |
| F | T | T |
| F | T | T |
| F | F | T |
| F | T | T |
| F | F | T |

Thus, it is clear that the expression "A⊃B" is in class β since, for all possible values of "p," "q" and "r," the expression "A⊃B" is true. Additionally, therefore, "B" is logically implied by "A" since no interpretation which makes "A" true will make "B" false. The function of the machine disclosed herein is to perform the mechanical steps which are necessary to determine the class, i.e., α, β or γ, within which a given expression belongs, the above mentioned rules of logic, i.e., rules of transformation, being built into the operation of the machine.

The present invention may be referred to as an analog decision machine, i.e., a machine that will automatically decide by analogies whether some conclusion logically follows from some other given information by examining the electrical analogies of the conclusion and of the given information. The analogy utilized is between the above mentioned rules of transformation of the language of sentential calculus and the properties of switching circuits. Just as an expression may take only one of two values, i.e., true or false, so an elementary electrical circuit can only be either closed or open. Just as a compound expression is built up from elementary components by logical connectives such as "and" and "or," so compound electrical circuits are built up of elementary circuits in either series or parallel.

Figure 3:
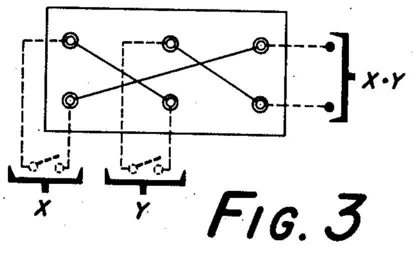
Fig. 3 is a schematic diagram of a "conjunction" circuit.
Figure 4:
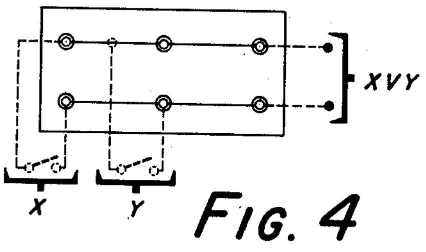
Fig. 4 is a schematic diagram of an "alternation" circuit.
Figure 5:
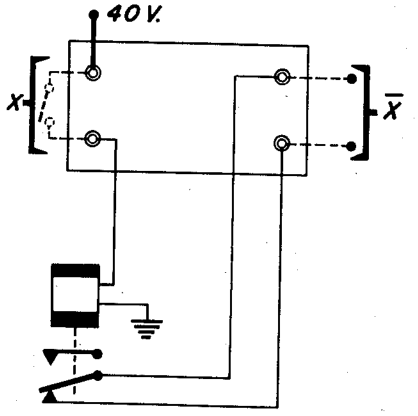
Fig. 5 is a schematic diagram of a "negation" circuit.

The conjunction "x.y" is true if and only if both "x" and "y" are true, and a compound electrical series circuit with x and y as components is closed (true) if and only if both x and y are closed (true). Similarly, the compound expression "xvy" is true if either "x" or "y" is true, and the compound electrical parallel circuit made up of x and y as components is closed (true) if either x or y is closed (true). The logical operation of negation has as its electrical analog the circuit described by the normally closed points of a relay. If the circuit to the relay coil (which may be referred to as circuit x) is closed, the normally closed points ($\bar{x}$) will be open, and vice versa. Schematic diagrams of the circuits of conjunction, alternation and negation are shown in Figs. 3, 4 and 5, respectively.

Figure 1B:
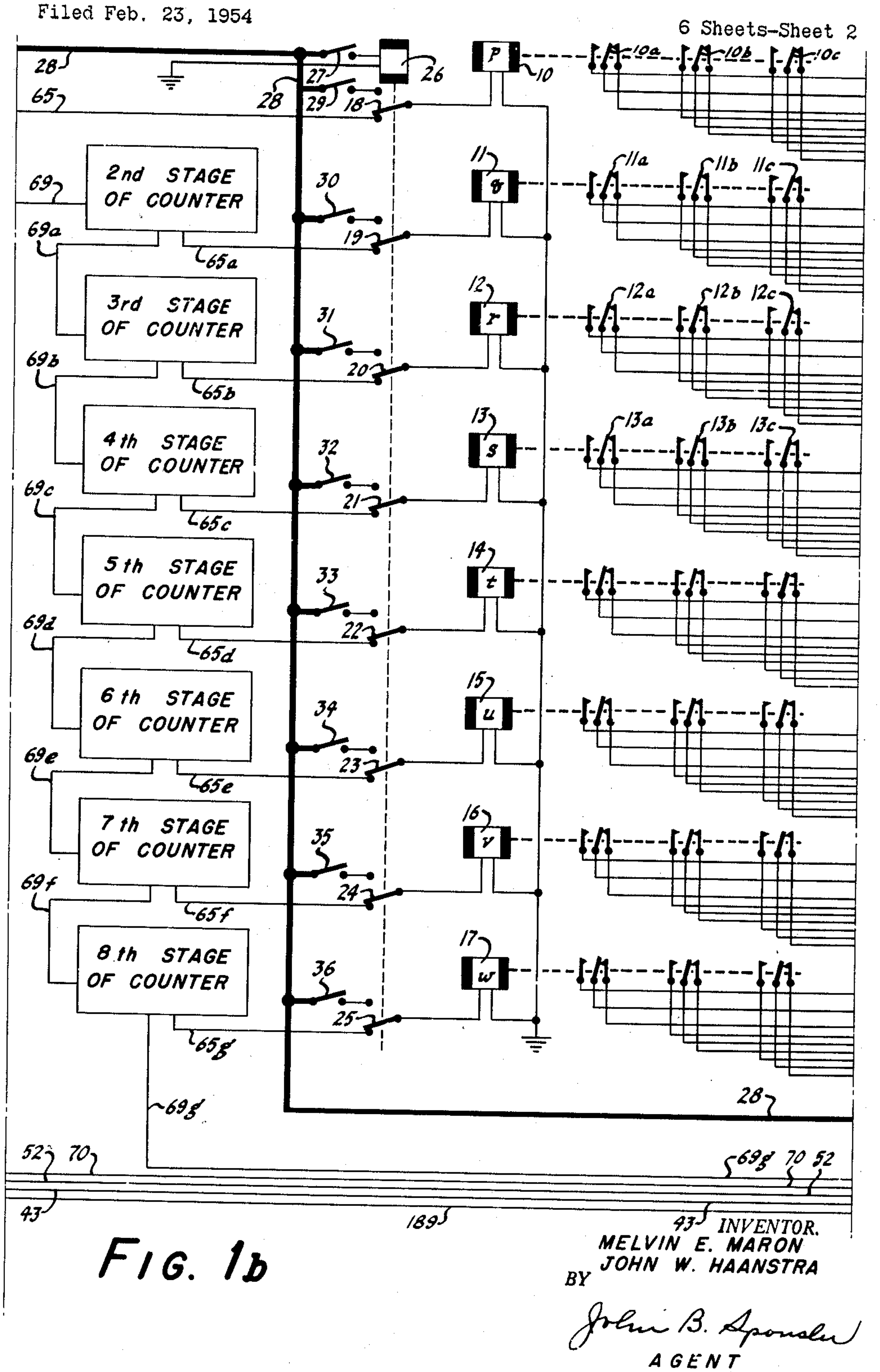
Figure 1C:
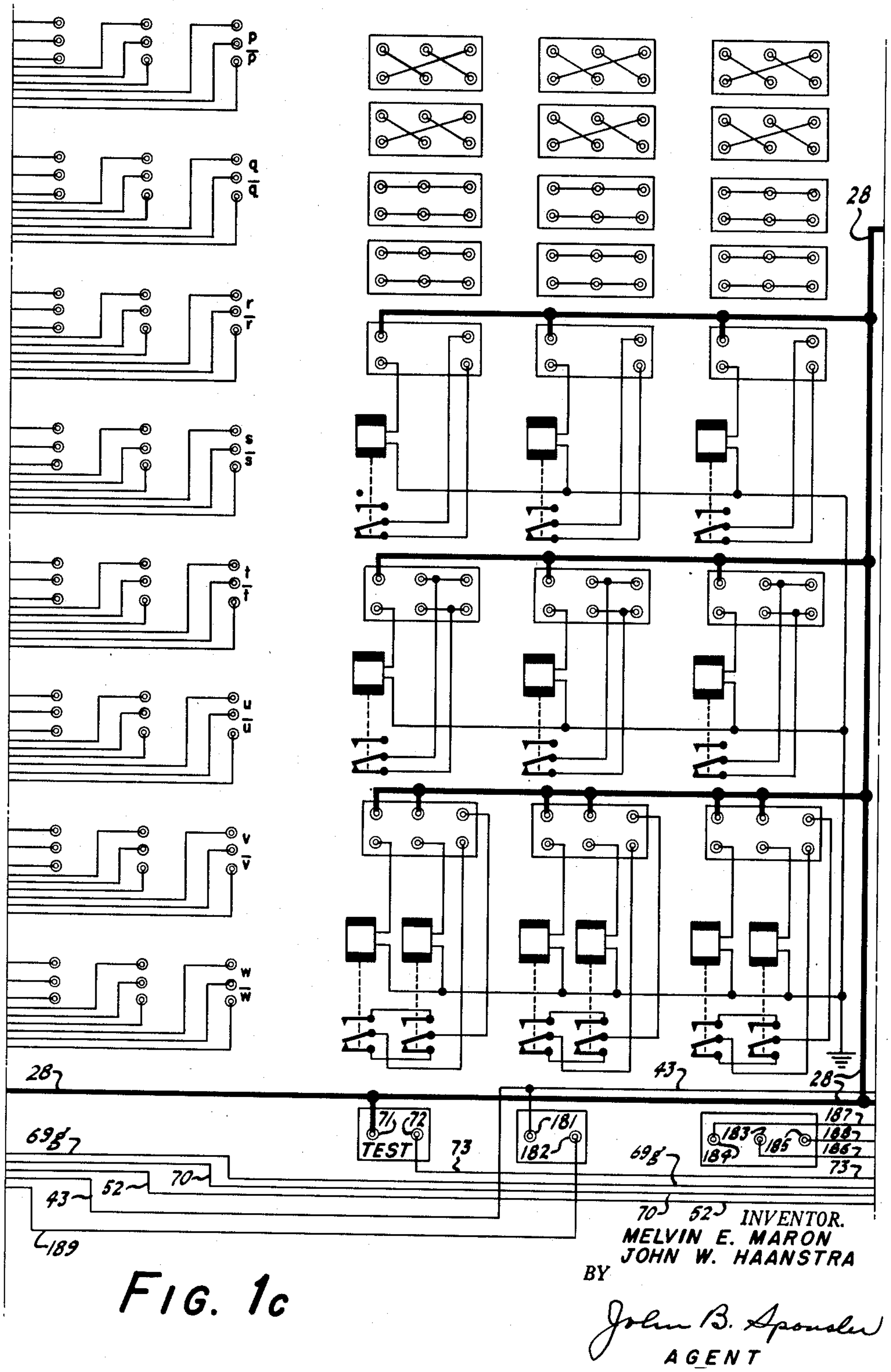
Figure 2:
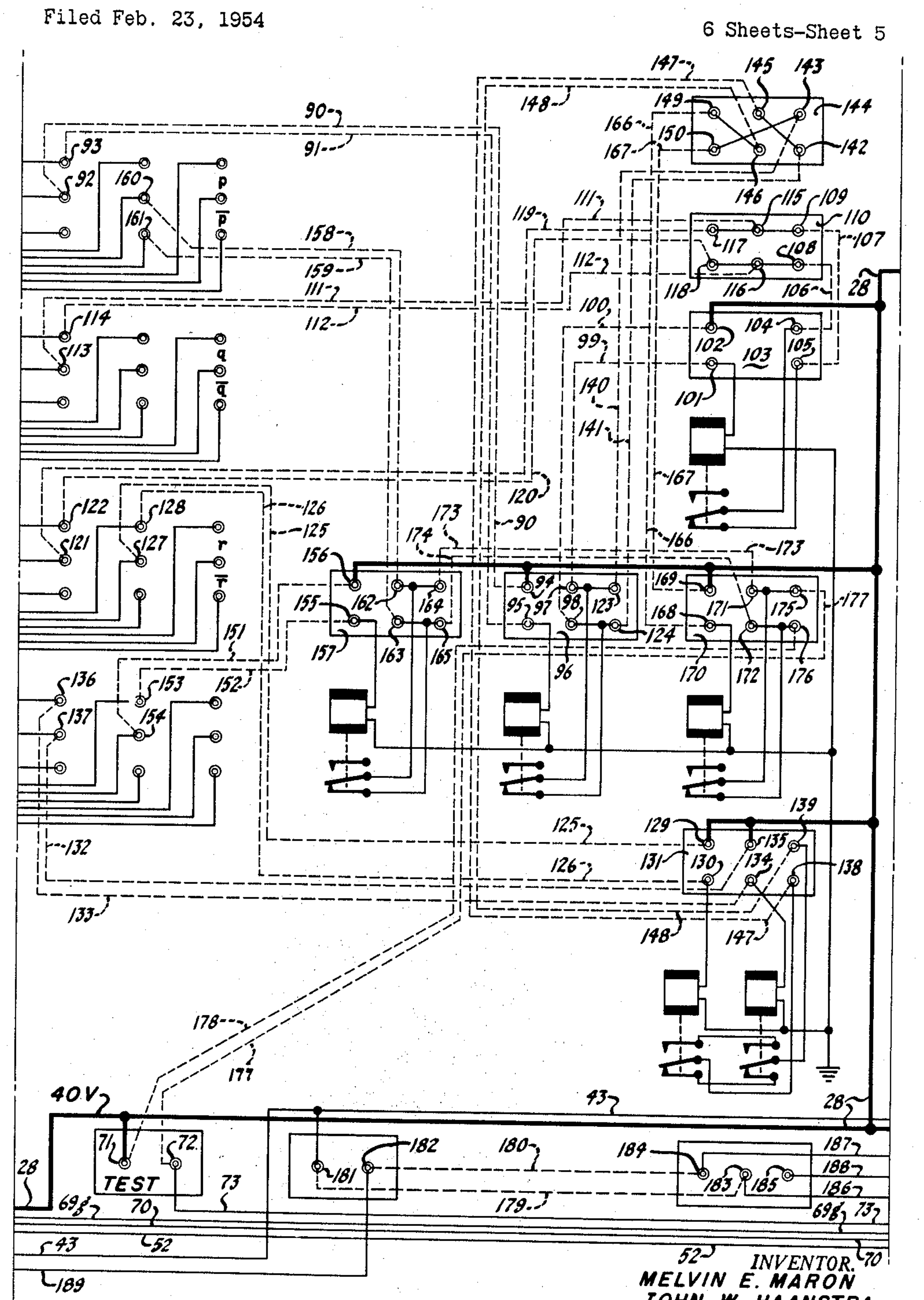
Fig. 2 is similar to that portion of Fig. 1 shown in Fig. 1*c*, certain unused portions thereof having been omitted; however, a sample problem has been wired thereon to illustrate the operation of the invention.
Figure 7:
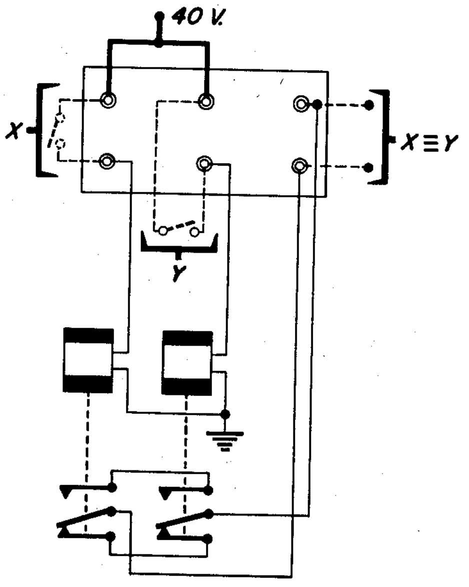
Fig. 7 is a schematic diagram of a "bi-conditional" circuit.
Figure 6:
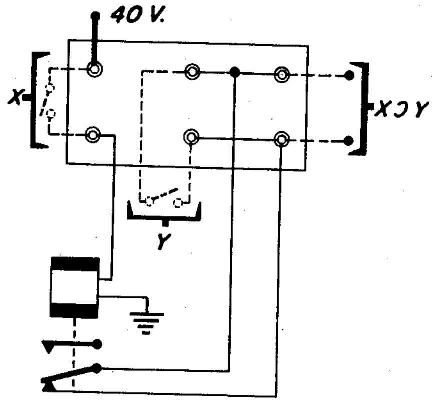
Fig. 6 is a schematic diagram of a "conditional" circuit.

The electrical analogies for the conditional and bi-conditional connectives are illustrated in Figs. 6 and 7, respectively. Referring to Fig. 6, it will be seen that "x⊃y" is open (false) only when "x" is closed (true) and "y" is open (false). In Fig. 7, "x≡y" is open (false) only when either "x" is open (false) and "y" is closed (true) or when "x" is closed (true) and "y" is open (false), i.e., when "x" and "y" have different truth values. Several of each of the circuits disclosed in Figs. 3 through 7 are shown in Figs. 1c and 2, the actual number of such circuits being dependent upon the number necessary for the solution of a given problem. The various terminals of these circuits are connected to appropriate contacts of an ordinary plugboard and plug wires are provided to permit the variables "p," "q," "r," etc., to be joined by suitable connectives, as may be desired.

Each of the variables "p," "q," "r," etc., is represented by the normally open points of a relay, the normally closed points thereof representing "$\bar{p}$," "$\bar{q}$," "$\bar{r}$," etc. In the present embodiment eight multiple contact relays 10 through 17 (Fig. 1b) are provided to represent eight variables "p" through "w," respectively. It should be clear, however, that any convenient number of such relays may be employed. When the circuit to the coil of a particular relay, the coil of the "p" relay 10, for example, is open, the circuit between the "p" contacts, i.e., the normally open contacts of relay 10, is open while the circuit between the "$\bar{p}$" contacts, i.e., the normally closed contacts of relay 10, is closed, thus properly indicating that when "p" is false (open) "$\bar{p}$" is true (closed), or vice versa.

One side of each of the relays 10 to 17 inclusive is connected to ground, the other side of each said relay being connected to one of the armatures 18 through 25, respectively, of a relay 26. The winding of the relay 26 is connected between ground and one side of a normally open switch 27, and the other side of the switch 27 is connected to a 40-volt line 28. When the switch 27 is closed, the relay 26 is energized and the coils of the relays 10 through 17 are connected to one side of several normally open switches 29 through 36, respectively, the other side of each of said switches being connected to the 40-volt line 28. Thus, when the switch 27 is closed, the relays 10 through 17 may be selectively energized by manual operation of the several switches 29 through 36, respectively.

When the switch 27 is open, the coil of each relay 10 through 17 is connected to a successive stage of a suitable eight-stage binary counter to thereby permit these relays to be automatically selectively energized singly and in sequential combination, according to a prearranged plan. In this way all possible combinations of the energized state of the relays 10 to 17 inclusive may be stepped through automatically. In the present embodiment, with 8 variables, there are $2^8=256$ such combinations, e.g., with relay 10 energized or "on" and relays 11 through 17 de-energized or "off," relay 11 on and the rest off, relays 10 and 11 on and the rest off, etc.

Figure 1D:
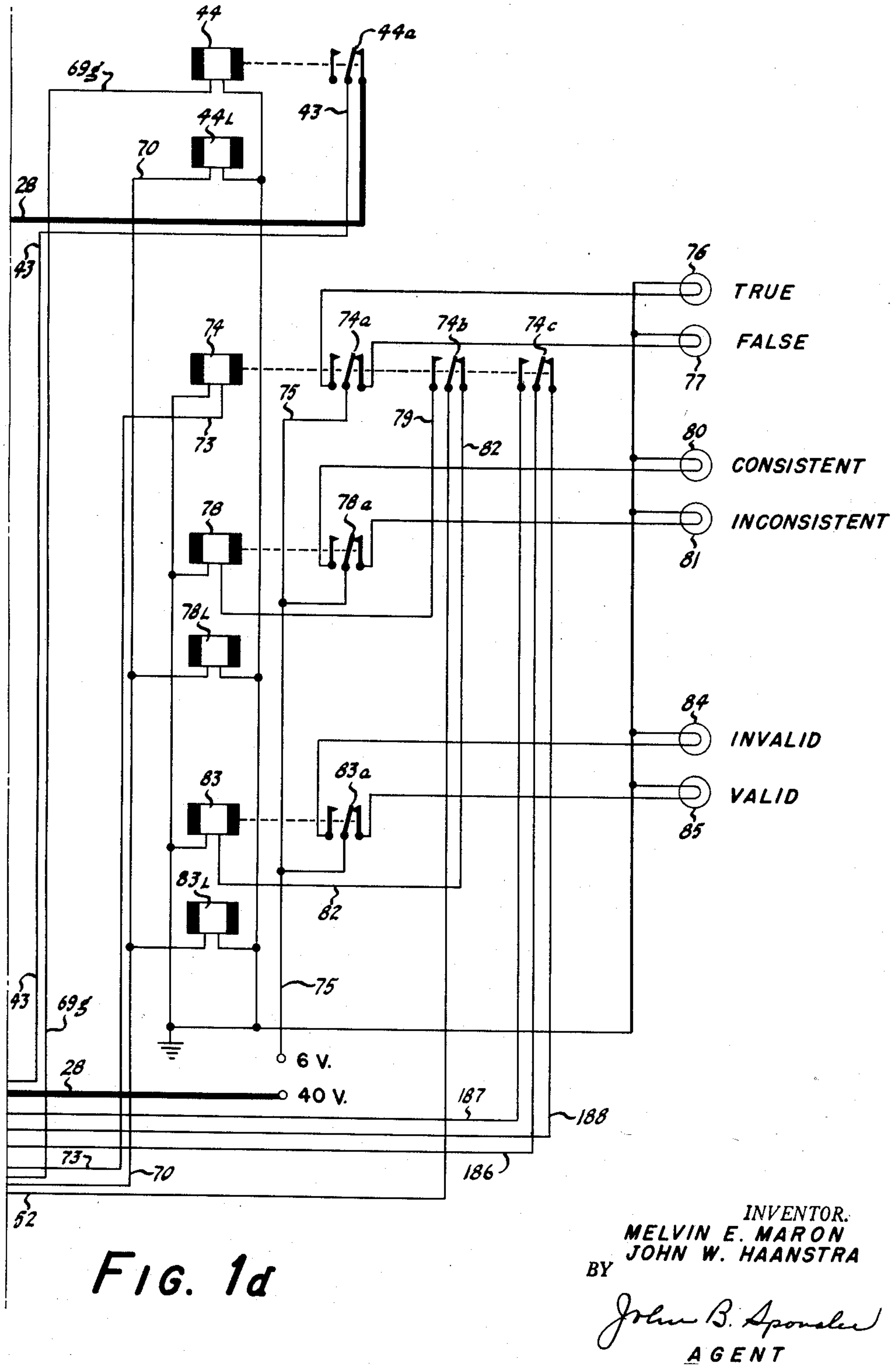

The first stage of the counter (Fig. 1a) is triggered by pulses supplied thereto from a pulse generator comprising three multiple contact relays 37, 38 and 39. The armature associated with contacts 39a of the relay 39 is connected to the armature of a switch 40, which switch will be referred to as the "automatic-semi-automatic" switch. With the switch 40 in the "on" or "automatic" position, the armature of the contacts 39a is connected to the 40-volt line 28 through the armature of the switch 40, through a line 41, through a normally closed switch 42, through a line 43, and through the normally closed contacts 44a (Fig. 1d) of a relay 44. When the switch 40 is in the "off" or "semi-automatic" position, the armature of the contacts 39a is connected to one side of a normally open key 45, the other side of said key being connected to the 40-volt line 28, by the same circuitry above described. The relay 44, which is referred to as the "stop" relay, is of the latch type and, when energized, latches the normally open contacts thereof closed, thus removing the 40-volt supply from the line 43 until the contacts are again unlatched. It should be clear, therefore, that when contacts 44a are in their normal position, i.e., as shown in the diagram, 40-volts is present on the line 43 and may be supplied to the armature of the contacts 39a either constantly, when the switch 40 is on, or when desired, by the manual operation of the key 45, when the switch 40 is off.

The operation of the pulse generator is as follows. Starting with the relays 37, 38 and 39 in their normal de-energized position, when 40 volts is supplied to the armature of the switch 40, the relay 37 is energized, since a circuit is completed from the 40-volt supply through the normally closed contacts 39a of the relay 39, through a line 46, and through the coil of relay 37 to ground. As soon as relay 37 picks up, relay 38 is energized due to the circuit completed from the armature of the switch 40 through a line 47, through the normally open contacts 37*a* of relay 37, through a line 48, and through the coil of relay 38 to ground. Energization of relay 38 causes the normally open contacts 38*a* thereof to close, thereby energizing relay 39 by establishing a circuit from the armature of the switch 40 through the line 47, through the normally open contacts 38*a*, through a line 49, and through the coil of relay 39 to ground. It should be obvious that, when relay 39 picks up, relay 37 drops out, thereby causing relay 38 to drop out, which in turn causes relay 39 to drop out. The above described cycle of operation is then repeated. During the time that relay 38 is energized, a 40-volt "counter" pulse is supplied from the armature of the switch 40 through the line 47, through the normally open contacts 38*b* of relay 38, and through a line 50 to the first stage of the counter. Additionally, while relay 37 is energized and while relays 38 and 39 are de-energized, a 40-volt "test" pulse is applied from the armature of the switch 40 to a line 52 through the contacts 39*a*, through the line 47, through the normally closed contacts 38*b*, through the normally open contacts 37*b*, through a line 51, and through the normally closed contacts 39*b*, for a purpose to be more fully explained hereinafter. It should be understood, however, that the test pulse is emitted immediately prior to the counter pulse.

As mentioned above, the 40-volt pulse placed on line 50 by the pulse generator is fed to the first stage of the counter. The first stage, as well as each successive stage, comprises three multi-contact relays 53, 54 and 55. When the elements of the counter are in the position shown in the drawing, i.e., when all relays 53, 54 and 55 are de-energized, the 40-volt pulse from line 50 is applied through a line 56, through the normally closed contacts 55*a* of the relay 55, through a line 57, through the normally closed contacts 53*d* of the relay 53, through a line 58, and through the winding of the relay 54 to ground, thereby energizing relay 54. The armature 54*b'* associated with the contacts 54*b* of the relay 54 is connected through a line 59 to a line 60, the line 60 being connected through a normally closed "reset" switch 61 to the 40-volt line 28. Thus, when the relay 54 picks up, 40 volts is placed across the relay 55 due to the circuit completed through the normally open contacts 54*b* of relay 54, through a line 62, and through the coil of relay 55 to ground, thereby energizing relay 55. Relay 54 is energized only while the 40-volt pulse from the pulse generator is present on the line 50, and as soon as the 40 volts is cut off by the de-energization of the relay 38, the relay 54 drops out. Relay 55 is locked down, however, since the line 62 is connected through the normally open contacts 55*b* thereof to the 40-volt line 28 through a line 63, through the normally closed contacts 53*c* of relay 53, and through the line 60 and switch 61.

While relay 55 is energized, the relay 10 (Fig. 1*b*) is energized since a circuit is completed from the 40-volt line 28 through a line 64, through the normally open contacts 55*c* of relay 55, through a line 65, through the normally closed contacts 18 of the relay 26 and through the winding of relay 10 to ground. The elements of the first stage of the counter will remain in this position and will thereby maintain the relay 10 energized until the next pulse from the pulse generator is received.

When the next 40-volt pulse is present on line 50, relay 53 is energized due to the completed circuit from line 50 through the line 56, through the normally open contacts 55*a*, through a line 66, through the normally closed contacts 54*c*, through a line 67, and through the coil of the relay 53 to ground. As soon as relay 53 picks up, the 40 volts supplied through the contacts 53*c* to the coil of relay 55 is cut off and relay 55 drops out, thereby opening the circuit from the line 50 through the normally open contacts 55*a* to the coil of relay 53. Thus, when relay 55 drops out, relay 53 is de-energized, and the circuit returns to the normal position with each of the relays 53, 54 and 55 de-energized, as shown. It should be noted, however, that during the time that the relay 53 was energized 40 volts was present on a line 69 due to a circuit completed from the line 28 through the normally open contacts 53*b*.

The second stage of the counter, as well as each successive stage, is identical to that stage just described, the input pulse to the second stage being taken from the line 69 in the same manner that the input pulse to the first stage was taken from the line 50. It should now be clear that on the first, third, fifth, etc., pulses to each stage of the counter, the corresponding relay 10 through 17 will be energized, said relay being de-energized on even-numbered pulses, and every second pulse received by each stage of the counter causes a pulse to be transmitted to the next successive stage in a manner common to many forms of binary counters. In this way, the relays 10 through 17 are selectively energized in varying combinations.

The coil of the relay 44 (Fig. 1*d*) is connected to the line 69*g* (Fig. 1*b*) leading from the eighth stage of the counter, and when the eighth stage receives its second pulse, 40 volts is connected from the line 28 through the eighth stage of the counter and through the coil of the relay 44 to ground, thereby momentarily energizing said relay and locking its normally open contacts 44*a* closed, as described earlier. In this way, the power to the pulse generator is cut off and the operation of the device is halted when one cycle of operation is completed.

One function of the reset switch 61 mentioned above is to return the counters to their starting position whenever desired. Additionally, when the switch 61 is depressed, a 40-volt pulse is applied to the latch winding 44L of the relay 44 to unlatch it and allow its contacts to return to their normal position, thereby again connecting the pulse generator to the 40-volt line 28 to permit repetition of the cycle described above.

One of the two test terminals, terminal 71 (Fig. 1*c*) is connected to the 40-volt line 28, and the other terminal 72 is connected through a line 73 and through the winding of a relay 74 (Fig. 1*d*) to ground. Thus, when circuitry is terminated at the test terminals 71 and 72, as will be more fully explained later herein, the 40 volts present on terminal 71 will apear on terminal 72 only if said circuitry furnishes a closed circuit. If closed, the relay 74, designated the "true-false" relay, is energized and 6 volts is applied from a line 75 through the normally open contacts 74*a* of relay 74 and through a light bulb 76 to ground. The light bulb 76 is designated the "true" bulb, and it should be clear that when there is a closed circuit between the test terminals 71 and 72 the "true" bulb will light. When, however, the circuit between terminals 71 and 72 is open, the relay 74 is not energized and a bulb 77, the "false" bulb, is ignited, due to the circuit completed from the 6-volt line 75 through the normally closed contacts 74*a* of relay 74 and through the bulb 77 to ground.

It will be recalled that an intermittent 40-volt test pulse is created by the pulse generator and is applied to the line 52. The line 52 is connected to the armature of the contacts 74*b*, and the timing is such that the test pulse is applied to the line 52 and to the armature of the contacts 74*b* while the counter is in a quiescent or test state, since each test pulse is emitted immediately prior to each counter pulse. Thus, if the circuit between the terminals 71 and 72 is closed during the transmission of a test pulse, the relay 74 will be picked up as described above, and the test pulse will energize a relay 78 since a circuit is completed from the line 52, through the normally open contacts 74*b* of relay 74, through a line 79, and through the coil of relay 78 to ground. The relay 78 is of the latch type, and, when energized, its contacts will lock in their actuated position.

While the contacts of relay 78 are latched down, 6 volts from the line 75 is applied through a bulb 80 to ground, thereby igniting said bulb. The bulb 80 is denoted the "consistent" indicator and will light if at least one closed circuit between terminals 71 and 72 has been indicated. A bulb 81, denoted the "inconsistent" indicator, will light if no closed circuit is indicated, since in this case the relay 78 is never energized and its contacts remain in the position shown in the drawing.

If the circuit between the test terminals 71 and 72 is open at least once during the period that a test pulse is present on the line 52, said pulse will be applied through the normally closed contacts 74*b* of relay 74, through a line 82, through the coil of a relay 83, designated the "false" relay, to ground, thereby energizing said relay. Relay 83, like the relay 78, is a latch relay and if there is at least one open circuit between terminals 71 and 72 the relay 83 is energized and latched down, thus igniting a bulb 84, due to the circuit completed from the line 75 through the normally open contacts 83*a* and through the bulb 84 to ground. The bulb 84 is designated the "invalid" bulb, and it should now be clear that, when it is lit, at least one open circuit has been reported. If the circuit between terminals 71 and 72 is never open, a bulb 85, denoted the "valid" bulb, is lit, and if it is lit at the conclusion of the test, it is indicative of the fact that the circuitry being tested is always closed. At the conclusion of a test, the latch relays 78 and 83 may be unlatched and returned to normal by depression of the reset key 61, as described above in connection with relay 44.

It will be recalled that the machine of the invention will decide whether or not one piece of information is logically implied from other given information. To illustrate how this is accomplished and also to show how a problem is wired into the machine, the following example is given. Assume that it is known that, if ABC Company loses money this year, then there will not be either a cash dividend or a stock dividend and, further, that a stock dividend will be declared by ABC Company if and only if it invests additional capital in self-expansion. This information may be broken down into four basic sentences which may be designated as "*p*," "*q*," "*r*," and "*s*," e.g., let "*p*"=ABC Company will lose money, "*q*"=there will be a cash dividend, "*r*"=there will be a stock dividend, and "*s*"=ABC Company will invest money in self-expansion. By using the symbols of the logical connectives defined above, the information may be written as follows: "$(p \supset \overline{qvr}).(r \equiv s)$."

The question may now be asked, for example, does it logically follow from the given basic information that if ABC Company invests money in self-expansion, then it did not lose money? This may by symbolized as follows: "$s \supset \bar{p}$." Logic tells us that "$s \supset \bar{p}$" is logically implied by "$(p \supset \overline{qvr}).(r \equiv s)$," if the expression $$\text{“}[(p \supset \overline{qvr}).(r \equiv s)] \supset (s \supset \bar{p})\text{”}$$

falls into the class $\beta$. To say that an expression falls into the class $\beta$ is to say that for all possible truth values of its elementary components, i.e., "*p*," "*q*," "*r*," and "*s*," the compound statement will always be true. All that remains is to wire the compound expression into the machine plugboard (Fig. 1*c*) by means of plug wires.

By letting "$(p \supset \overline{qvr})$"="*A*," "$r \equiv s)$"="*B*," and

"$(s \supset \bar{p})$"="*C*"

then the compound expression may be written as

"A.B⊃C"

Again, by letting "A.B"="D," then the compound expression may be further simplified as "D⊃C." Referring to Fig. 2, the example given above is shown wired on the plugboard disclosed in Fig. 1*c*. To wire "A," i.e., "$(p \supset \overline{qvr})$," on the plug board, two wires 90 and 91 are connected to extend from "*p*" terminals 92 and 93 to input terminals 94 and 95, respectively, of a "conditional" circuit 96, the "*p*" terminals 92 and 93 being connected to the normally open contacts 10*a* of the "*p*" relay 10 (Fig. 1*b*). The input terminals 97 and 98 (Fig. 2) of the circuit 96 are connected by plug wires 99 and 100 to terminals 101 and 102, respectively, of a "negation" circuit 103, the output terminals 104 and 105 of the circuit 103 being connected by wires 106 and 107 to input terminals 108 and 109 of an "alternation" circuit 110. Two wires 111 and 112 are connected to extend from "*q*" terminals 113 and 114 to the terminals 115 and 116 of the circuit 110, and the "*q*" terminals 113 and 114 are connected to the normally open contacts 11*a* (Fig. 1*b*) of the "*q*" relay 11. The two remaining terminals 117 and 118 (Fig. 2) of the "alternation" circuit 110 are connected by wires 119 and 120 to "*r*" terminals 121 and 122, said last mentioned terminals being connected to the normally open contacts 12*a* (Fig. 1*b*) of the "*r*" relay 12. This completes the wiring of "A," "A" being represented by the circuit between the output terminals 123 and 124 (Fig. 2) of the "conditional" circuit 96.

"B," i.e., "$(r \equiv s)$," is wired by connecting wires 125 and 126 from "*r*" terminals 127 and 128 to the input terminals 129 and 130 of a "bi-conditional" circuit 131, the terminals 127 and 128 being connected to the normally open contacts 12*b* (Fig. 1*b*) of the "*r*" relay 12. Wires 132 and 133 (Fig. 2) are arranged to extend from the input terminals 134 and 135 of the "bi-conditional" circuit 131 to "*s*" terminals 136 and 137, said last mentioned terminals being connected to the normally open contacts 13*a* (Fig. 1*b*) of the "*s*" relay 13. The circuit between the output terminals 138 and 139 of the "bi-conditional" circuit 131 is representative of "B."

To wire "D," i.e., the conjunction "A. B," the output terminals 123 and 124 (Fig. 2) of the "conditional" circuit 96 are connected by wires 140 and 141 to terminals 142 and 143 of a "conjunction" circuit 144, and the terminals 145 and 146 of said circuit are connected by wires 147 and 148 to the output terminals 138 and 139 of the "bi-conditional" circuit 131. The circuit analog of "D" may then be taken from two output terminals 149 and 150 of the "conjunction" circuit 144.

"C," i.e., "$s \supset \bar{p}$," is wired by connecting wires 151 and 152 from "*s*" terminals 153 and 154 to input terminals 155 and 156 of a "conditional" circuit 157, the terminals 153 and 154 being connected to the normally open contacts 13*b* (Fig. 1*b*) of the "*s*" relay 13. Wires 158 and 159 (Fig. 2) are utilized to join "$\bar{p}$" terminals 160 and 161 to input terminals 162 and 163 of the "conditional" circuit 157, and the terminals 160 and 161 are connected to the normally closed contacts 10*b* (Fig. 1*b*) of the "*p*" relay 10. The circuit resulting between the output terminals 164 and 165 (Fig. 2) of the "conditional" circuit 157 is the analog of "C."

In order to wire the compound conditional expression "D⊃C," the ouput terminals 149 and 150 of the "conjunction" circuit 144 are connected by wires 166 and 167 to the input terminals 168 and 169 of a "conditional" circuit 170. The second set of input terminals 171 and 172 of the circuit 170 are connected to the output terminals 164 and 165 of the "conditional" circuit 157 by wires 173 and 174, and the circuit resulting between the output terminals 175 and 176 of the circuit 170 is the analog of "D⊃C." To complete the setup, the terminals 175 and 176 are connected by wires 177 and 178 to the test terminals 71 and 72 of the device.

It will be recalled that the terminal 71 is connected to the 40-volt line 28 and that the terminal 72 is connected by the line 73 through the coil of the "true-false" relay 74 (Fig. 1*d*) to ground, and it should be clear, therefore, that whenever the circuit between the terminals 71 and 72 is closed the "true-false" relay 74 is energized.

In operation, the four relays 10, 11, 12 and 13 are selectively energized either automatically, semi-automatically, or manually, as described hereinbefore, to step through the $2^4=16$ possible combinations of the state of energization of these relays. In this way, all 16 combinations of the truth values of "*p*," "*q*," "*r*" and "*s*" are successively formed, and during the period that each of the 16 combinations is set up, the test pulse taken from the normally closed contacts **39*b*** (Fig. 1*a*) of relay 39 is applied to the armature of the contacts **74*b*** (Fig. 1*d*) of the relay 74. If it should happen that at the time this pulse is present on the armature of the contacts **74*b*, the circuit between terminals 71 and 72 is open, the relay 74 will not be energized and the test pulse present on the armature of contacts 74*b* will be applied through the normally closed contacts 74*b* and through the coil of the latch relay 83 to ground, thereby energizing said relay, locking its normally open contacts 83*a* closed and causing the bulb 84 to be ignited. It will be recalled that when bulb 84** is lit it is an indication that at least one open circuit (false case) has been indicated and that, therefore, the conclusion drawn from the basic facts is invalid.

The present problem, i.e., the illustration wired in Fig. 2, will always provide a closed circuit between terminals 71 and 72, and the relay 83 (Fig. 1*d*) will never be energized, thus igniting the "valid" bulb and indicating that the compound expression "$D \supset C$" is always true. Additionally, since at least one closed circuit will be presented to terminals 71 and 72, the latch relay 78 will be energized and the "consistent" bulb 80 will be ignited. It should now be clear that, assuming the basic facts given to be true, the conclusion "$s \supset \bar{p}$" will always be true, regardless of the truth value of the components "*p*," "*q*," "*r*" and "*s*," and that, therefore, the compound expression falls into the class $\beta$.

The example given above is very simple, and it should be understood that it is given solely to illustrate the operation of the device. Much more complex expressions may be analyzed and wired into the machine in a similar manner. The number of basic sentences which may be programmed is limited only by the number of circuits available, which number may be increased as desired.

Under certain circumstances it may be expedient to have the apparatus cease operations when either an open or a closed circuit is indicated between the test terminals 71 and 72 (Fig. 2). If, for example, it is desired to stop the operation of the machine whenever an open circuit is recorded between the terminals 71 and 72, two wires 179 and 180 are connected between terminals 181 and 182 and terminals 183 and 184, respectively. It will be noted that the terminals 183 and 194 are connected by means of wires 186 and 187 (Fig. 1*d*) to the normally open contacts **74*c* of the relay 74, and as long as the circuit between the terminals 71 and 72 is closed relay 74 is energized and there is a closed circuit between the terminals 183 and 184. To complete the setup, the aforementioned switch 42** (Fig. 1*a*) in the power supply line 43 to the pulse generator is opened, thus connecting the pulse generator to the power supply line 43 through a line 189 connected to the terminal 182, through the line 180 to the terminal 184, through the line 187, through the normally open points **74*c* of relay 74, through the line 186 to the terminal 183, and through the line 179 to the terminal 181, the terminal 181 being connected to the line 43. As explained before, the line 43 is connected to the 40-volt line 28 through the normally closed contacts 44*a* of relay 44. Thus, whenever an open circuit is recorded between the terminals 71 and 72, the relay 74 will drop out, thereby opening the circuit between terminals 183 and 184, and the 40-volt supply to the pulse generator is cut off. The pulse generator is thereby rendered inoperative to emit another pulse to the counter, and the condition of the counter necessarily remains unchanged until the reset switch 61 is actuated. The device may be set to turn off automatically whenever a true answer is received by connecting terminals 183 and 185 to the terminals 181 and 182 with the wires 179 and 180**.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A logical data computing device comprising a plurality of primary circuits representative of premises of data, each said circuit having two conditions of conductivity representative of the truth or falsity of said premises, a plurality of connecting circuits representative of certain logical connectives, means for combining said primary circuits through said connecting circuits to form a complex circuit representative of a proposition in terms of said premises and said logical connectives, means for successively selecting all combinations of the conditions of conductivity of said primary circuits for successively representing all combinations of truth values of said premises, means for indicating the continuity of said complex circuit for each of said combinations of the conditions of conductivity of said primary circuits for resolving the truth value of said proposition for each combination of truth values of said premises, said means being operable in timed relation with said selecting means, means for indicating if said complex circuit is open for any one of said combinations of the conditions of conductivity of said primary circuits for resolving the validity of said proposition, means for indicating if said complex circuit is closed for any one of said combinations of the conditions of conductivity of said primary circuits for resolving the consistency of said proposition, and means for rendering said selecting means inoperative if said complex circuit is ever open, whereby the particular combinations of truth values of said premises which render said proposition invalid may be analyzed.

2. A logical data computing device comprising a plurality of primary circuits representative of premises of data, each said circuit having two conditions of conductivity representative of the truth or falsity of said premises, a plurality of connecting circuits representative or certain logical connectives, means for combining said primary circuits through said connecting circuits to form a complex circuit representative of a proposition in terms of said premises and said logial connectives, means for successively selecting all combinations of the conditions of conductivity of said primary circuits for successively representing all combinations of truth values of said premises, means for indicating the continuity of said complex circuit for each of said combinations of the conditions of conductivity of said primary circuits for resolving the truth value of said proposition for each combination of truth values of said premises, said means being operable in timed relation with said selecting means, means for indicating if said complex circuit is open for any one of said combinations of the conditions of conductivity of said primary circuits for resolving the validity of said proposition, means for indicating if said complex circuit is closed for any one of said combinations of the conditions of conductivity of said primary circuits for resolving the consistency of said proposition, and means for rendering said selecting means inoperative if said complex circuit is ever closed, whereby the particular combinations of truth values of said premises which render said proposition consistent may be analyzed.

References Cited in the file of this patent

UNITED STATES PATENTS 2,776,405 Moore et al. ............ Jan. 1, 1957

OTHER REFERENCES

Berkeley: Giant Brains, Wiley, 1949, pgs. 144–146.

McCallum et al.: "Mechanized Reasoning, Logical Computers and Their Design," Electronic Engineering, vol. 33, No. 278, April 1951, pages 126–133.

UNITED STATES PATENT OFFICE

CERTIFICATE OF CORRECTION

Patent No. 2,944,738 July 12, 1960

Melvin E. Maron et al.

It is hereby certified that error appears in the printed specification of the above numbered patent requiring correction and that the said Letters Patent should read as corrected below.

Column 6, line 43, for "apear" read -- appear --; column 7, line 65, for '"$r \equiv s$)"' read -- "($r \equiv s$)" --; column 9, line 54, for "194" read -- 184 --.

Signed and sealed this 25th day of April 1961.

(SEAL)
Attest:

ERNEST W. SWIDER
Attesting Officer

DAVID L. LADD
Commissioner of Patents